United States Patent
Derderian et al.

[15] 3,681,608
[45] Aug. 1, 1972

[54] LASER BEAM RECEIVER HAVING A HIGH SIGNAL TO NOISE RATIO

[72] Inventors: George Derderian, Maitland; Denis R. Breglia, Altamonte Springs, both of Fla.

[73] Assignee: The United States of America as represented by the Secretary of the Navy

[22] Filed: March 17, 1971

[21] Appl. No.: 125,160

[52] U.S. Cl. ............250/231 R, 350/166, 250/217 R, 250/276
[51] Int. Cl. ................................................Gold 5/34
[58] Field of Search......250/226, 238, 221, 222, 215, 250/231, 234, 229, 217 R; 350/166, 253

[56] References Cited

UNITED STATES PATENTS

| | | | |
|---|---|---|---|
| 3,537,306 | 11/1970 | Bedinger | 350/166 X |
| 3,447,875 | 6/1969 | Goldberg | 350/253 X |
| 3,279,309 | 10/1966 | Goldberg | 350/253 X |
| 3,085,468 | 4/1963 | Hehn | 350/166 X |
| 2,967,249 | 1/1961 | Quirk | 250/215 |

*Primary Examiner*—Walter Stolwein
*Attorney*—Richard S. Sciascia and John W. Pease

[57] ABSTRACT

A receiver in a weapon fire simulator system including a gallium arsenide laser utilizes a relatively narrow band-pass filter whose spectral transmittance peaks in the spectral region corresponding to the spectral emission of the gallium arsenide laser operating at the highest expected ambient operation temperature. The filter is rotated about an axis perpendicular to the propagation direction of the transmitted radiation by thermally responsive means so that shifts in peak transmission wavelength tend to track changes in spectral emission of the laser.

5 Claims, 2 Drawing Figures

INVENTORS
GEORGE DERDERIAN
DENIS R. BREGLIA

BY Harvey A. David
John M. Pease

ATTORNEYS

LASER BEAM RECEIVER HAVING A HIGH SIGNAL TO NOISE RATIO

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the detection of emissions of gallium arsenide lasers, and more particularly to means for enhancing the signal to noise ratio in such detection, for example in weapon fire simulator systems utilizing gallium arsenide lasers as transmitters.

The utilization of a gallium arsenide laser mounted on the weapon together with a silicon photodiode on the target provides for effective quick fire and marksmanship training without the expense and hazards associated with standard ammunitions. An example thereof is described in a copending U.S. Pat. application Ser. No. 40,072, filed May 25, 1970, and assigned to the assignee hereof. The spectral sensitivity of the detector is usually broadband with correspondingly high noise levels if the detected radiation is unfiltered.

Moreover, physical properties of a gallium arsenide laser are such as to cause the laser to change its spectral output as a function of ambient temperature. Since the training occurs outdoors there is a wide range of operating ambient temperatures encountered. The correspondingly relatively wide band of possible spectral emissions would seem to require a relatively wide band spectral transmission capability in the filter-detector assembly. The current method used is to provide a single relatively wide band-pass filter whose peak transmittance is in the spectral region corresponding to the spectral emission of the gallium arsenide laser at the average ambient temperature and sufficient bandwidth to transmit a significant portion of spectral emissions at longer or shorter wavelength regions corresponding to higher or lower ambient temperatures. The disadvantage of this technique is the relatively large amount of noise which is transmitted over this relatively large bandwidth of the filter.

The range of ambient temperatures typically encountered in training situations is approximately 40° C. The pertinent operational characteristics of a gallium arsenide laser are that the spectral emission peaks at a nominal 900.0 nm wavelength at 20° C with a spectral width of 0.4 nm. The change of peak emitted wavelength varies approximately as 0.25 nm/deg. C. As the ambient temperature increases, the peak transmitted wavelength increases while the spectral bandwidth of the emitted radiation remains relatively constant at 0.4 nm.

The usual method of using a relatively wide band spectral filter, to operate effectively through the expected range, requires a spectral bandwidth (defined as the wavelength width of the spectral transmittance curve as measured at the one-half peak transmittance level) of 10.0 nm having a peak transmittance at a wavelength corresponding to the average ambient temperature (900 nm at 20° C for example). The transmittance at 905 nm and 895 nm would be 50 percent of the peak transmittance. The total noise would be a constant since nothing is changed to affect the noise transmittance of the filter detector assembly.

SUMMARY OF THE INVENTION

With the foregoing in mind it is a principal object of this invention to provide, in a system including a gallium arsenide laser transmitter an improved laser beam receiver comprising in combination a relatively wide band photo-diode and a narrow band-pass filter means which is varied in its spectral transmission peak so that the peak transmittance of the filter will shift in wavelength as the ambient temperatures in which the system is operated change, whereby a high signal to noise level is maintained.

Another object of the invention is to provide such a receiver comprising filter means wherein shifts of peak transmittance are effected automatically in response to changes in ambient temperatures.

The invention may be further said to reside in certain novel combinations and arrangements of parts whereby the foregoing objects and advantages are achieved as well as others which will become apparent from the following description of the preferred embodiments when read in conjunction with the accompanying sheet of drawings.

DESCRIPTION OF THE PREFERRED EMBODIMENT

Figure 1:
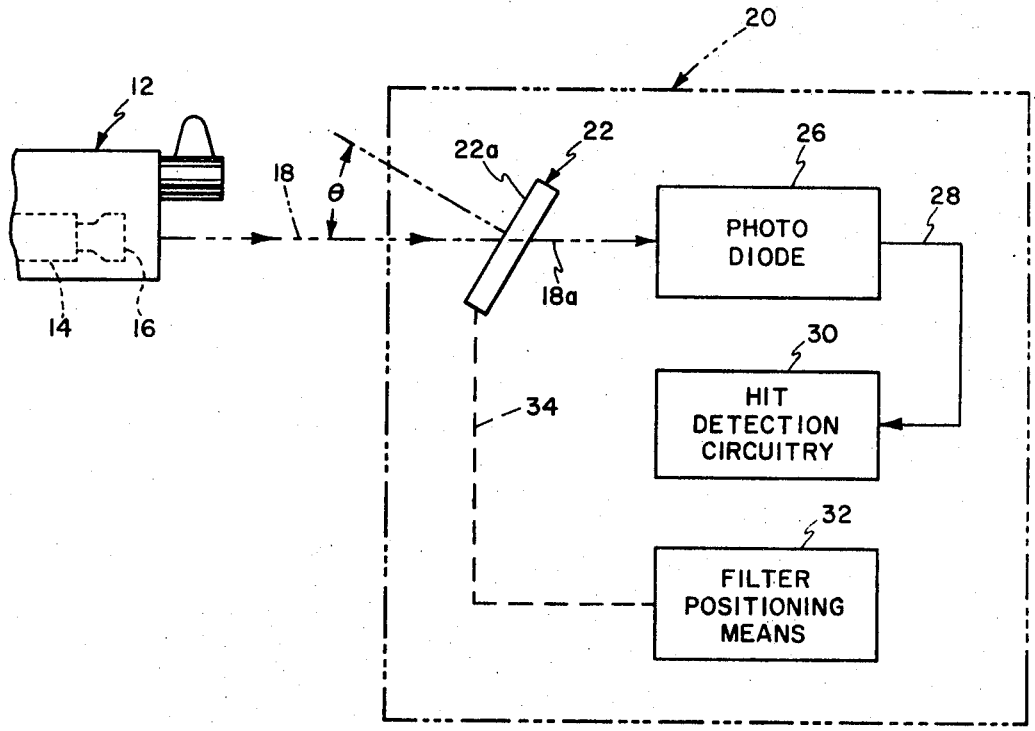
FIG. 1 is a diagrammatic illustration of a weapon fire simulator system including a laser beam receiver embodying the present invention.

In the form of the invention illustrated in the drawings and described hereinafter, a weapon fire simulator system 10 comprises a laser beam transmitter which is conveniently in the form of a weapon simulator 12 having a gallium arsenide laser 14 and the lens means 16 which emits a collimated beam 18 to a receiver 20. The receiver 20, which is typically in the form of a target comprises a rotatable narrow passband filter 22 which is positionable to vary the angle of incidence $\theta$ of the beam 18 with respect to the incident surface 22a of the filter. The filtered beam 18a is received by a photo-diode 26 which provides an input, represented by line 28, to hit detection circuitry 30.

The previously mentioned application Ser. No. 40,072 may be referred to for a description of a transmitter suitable for the weapon simulator 12 and for details regarding the photodiode and hit detection circuitry portions of the receiver 20.

The narrow band-pass filter 22 comprises a multilayer, dielectric interference type filter which is characterized by peak transmittance at a first wavelength for radiation which is incident normal to the receiving surface 22a of the filter and is further characterized by a shift of the peak transmittance toward shorter wavelengths as the angle of incidence $\theta$ increases. A commercially available example of such a filter is that sold as Filter Number S95173422 by Spectrum Systems, Inc., Waltham, Massachusetts.

The receiver 20 according to this invention comprises means 32, connected as indicated by line 34 to the filter 22, for positioning of the filter to vary the angle of incidence $\theta$. The peak transmittance wavelength of the filter can thereby be matched to the wavelength of peak emission energy of the gallium arsenide laser transmitter 12 which is affected by ambient temperatures.

The filter positioning means 32 may be a manually operated dial mechanism calibrated in temperature, but preferably is in the form of a thermally responsive means which will position the filter 22 in accordance with temperature changes so that the shift of peak transmittance of the filter will automatically track shifts in wavelength of peak energy output of the transmitter 12 with temperature changes.

Figure 2:
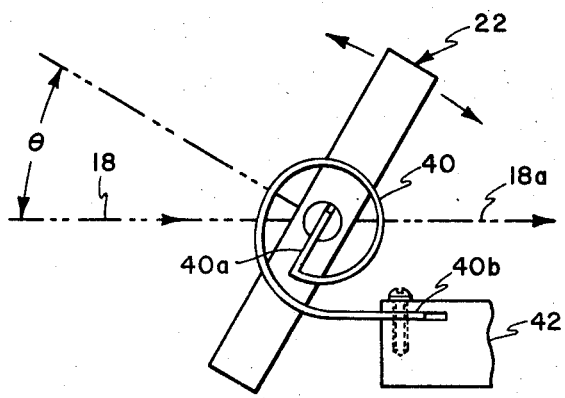
FIG. 2 is an enlarged view in more detail of the filter and filter positioning means of the receiver of FIG. 1.

Referring to FIG. 2, one example of a suitable thermally responsive filter positioning means is illustrated. Thus, the filter 22 is mounted by a shaft 38 for rotary movements about the axis of the shaft which runs normal to the direction of propagation of the incident beam 18. A coiled bimetal element 40 is secured at one end 40a to the shaft 38 and at the other end 40b to a portion 42 of support means in which the shaft 38 is suitably journalled. As ambient temperatures increase or decrease, the bimetal element 40 will rotate the filter 22 to change the angle of incidence $\theta$.

In a typical embodiment, a narrow band-pass filter having peak transmittance at 905 nm with a spectral width of 2 nm for 0° incidence was chosen. The variation of peak transmitted wavelength of this filter with amount of rotation was found to be approximately 0.7 nm/degree of rotation. A rotation of 15° is sufficient to shift the peak transmission from 905 nm to 895 nm. The rotation does cause the spectral transmittance bandwidth to spread from its minimum value of 2.0 nm at 905 nm peak to approximately 5.0 nm at 895 nm peak. For all cases, however, at any operating temperature, there is a significant increase in signal to noise ratio of the rotating narrow band-pass filter over the non-rotating, relatively wide band-pass, filter.

Obviously many modifications and variations of the present invention are possible in the light of the above teachings. It is therefore to be understood that within the scope of the appended claims the invention may be practiced otherwise than as specifically described.

What is claimed is:

1. A receiver for detection of a laser beam from a transmitter including laser means which generates a laser beam having peak energy in a narrow band of wavelengths which are a function of temperature conditions under which said transmitter is operated, said receiver comprising:
   narrow band-pass means mounted to receive radiation from said transmitter falling on a predetermined zone of said receiver;
   relatively wide band photo-diode means disposed to receive radiant energy passed by said filter means and operative in response thereto to provide corresponding output signals;
   circuitry responsive to said signals to provide utilization signals corresponding to presence of said beam at said zone;
   said filter means having an incident surface and being mounted for movement through a range of positions for varying the angle of incidence of said beam;
   said filter means being characterized by a shift in wavelengths of peak transmittance in accordance with said changes in said angle of incidence; and
   thermally responsive means connected to said filter means for effecting said movement thereof in accordance with changes in said temperature conditions to positions wherein the said wavelengths of peak transmittance of said filter means substantially correspond to the wavelengths of peak energy of said laser beam.

2. A receiver as defined in claim 1, and wherein: said filter means comprises a multi-layer, dielectric interference filter.

3. A receiver as defined in claim 2 and wherein: said thermally responsive means comprises a bimetal element.

4. A receiver as defined in claim 3, and wherein: said laser means comprises a gallium arsenide laser.

5. A receiver as defined in claim 3, and wherein: said photo-diode means comprises a silicon diode element.

* * * * *